Figure 1:
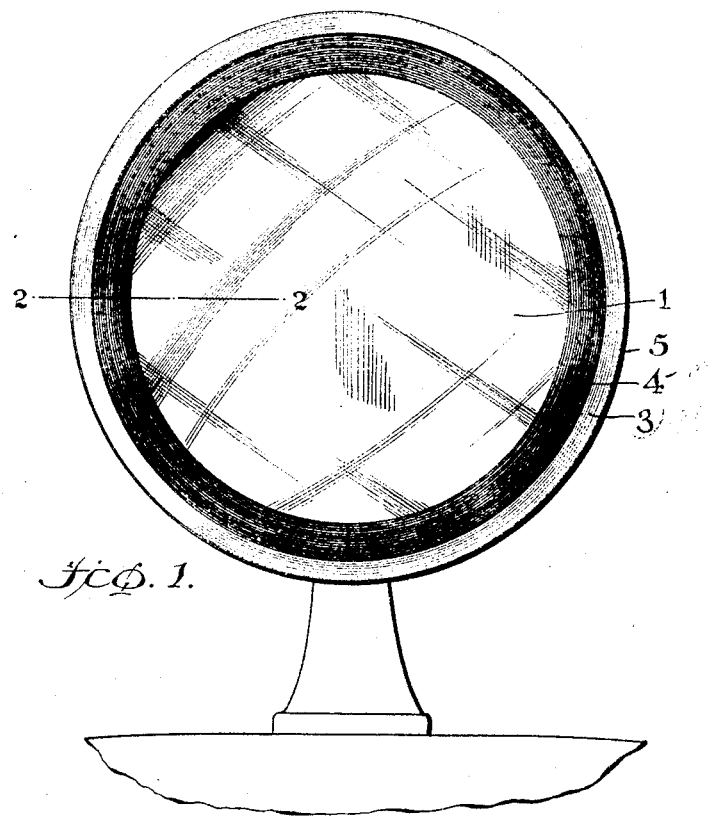

June 23, 1931.                E. C. HORTON                1,811,823
                               FENDER MIRROR
                            Filed Feb. 24, 1930

Inventor
Erwin C. Horton,
By Barton A. Bean Jr.
Attorney

Patented June 23, 1931

1,811,823

UNITED STATES PATENT OFFICE

ERWIN C. HORTON, OF HAMBURG, NEW YORK, ASSIGNOR TO TRICO PRODUCTS CORPORATION, OF BUFFALO, NEW YORK

FENDER MIRROR

Application filed February 24, 1930. Serial No. 430,963.

This invention relates to a rear view mirror and has particular reference to improving the same so as to facilitate viewing the images therein.

In keeping with the bright ornamental trim on the modern motor vehicle, the rear view mirrors applied particularly to the fenders and spare tires are also finished with a lustre. Chromium plate is a much used finish for the radiators, lamps and other automotive equipment, and in harmony with the general finishing scheme the rear view mirror is also given this bright reflective finish, and since the mirror frame extends over the edge of the glass there is provided a more or less confusing glare and reflection which tend to dim and obscure the true reflection of images, or the viewing of such images, within the reflective field. So that while a bright finish on the frame is desired to maintain the harmony throughout the automobile trim or finish, the same also has its disadvantage by reason of the fact that it merges into the reflective field and renders the latter indefinite as to extent as well as obscures the viewing of images in the field. This is due to a large extent to the reflections cast by the highly polished framing which encircles the reflective field, distracting and annoying as well as constituting a glare through which the image in the field is viewed.

The present invention has for its primary object to provide an improved mirror in which the disadvantages found in the use of the much desired and brightly finished framing are overcome; to provide an automotive accessory in the form of a rear view mirror having a frame capable of possessing the desired brilliant finish in which the reflective field is set off from the frame so as to permit a non-obscuring, clear vision of the images cast therein. The invention further has for its object to provide a framed mirror in which the reflective field is bordered by a defining, non-reflective margin which spaces or definitely sets off and removes the same from the brilliantly finished frame to the riddance and elimination of any view obscuring light rays and glare from the frame while looking into the mirror.

Figure 2:
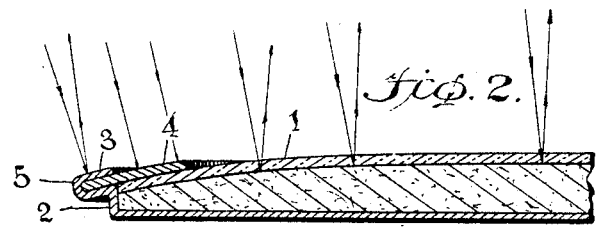

In the drawings:

Fig. 1 is a front elevation showing a mirror constructed in accordance with the present invention, and Fig. 2 is a detailed sectional view about on line 2—2 of Fig. 1.

Referring more in detail to the accompanying drawings, the numeral 1 designates the reflective field, herein depicted in the form of a convex glass plate, silvered on its back and contained within a cupped or other frame 2. The frame has a marginal flange 3 encircling the reflective field 1. The margin 3 along with the frame 2 is chromium plated or otherwise finished with a brilliancy in keeping with the harmony scheme in which the automobile is trimmed. Therefore, the bright and more or less reflective frame, bordering the reflective field, will reflect light rays into the observing eye to the obscurance of the viewing of the image in the reflective field. This is particularly true of chromium plate or other silvery finish which so closely matches the silvered field of reflection.

Means are provided for clearly and definitely setting off the reflective field apart from the margin 3, and in the present form this means comprises a band or border 4, of a non-reflecting finish, which clearly defines and separates the reflective field from the bright or reflective margin 3. While this defining border may be applied directly either to the glass plate or to the marginal body, I prefer to make it separate and distinct therefrom, such as in the form of an elastic or spring ring adapted to be sprung into interlocking relationship with the frame, as in the annular seat or groove 5 arranged beneath the margin 3, the ring extending well out from beneath the margin 3 and over the reflective field 1. Any suitable means may be provided for securing the mirror plate 1 within the frame although the border ring 4 may be utilized in such capacity and is herein depicted as serving the dual function of retaining the plate against displacement from the frame as well as providing a practical means for placing the field defining border thereabout.

By reason of this border, which is preferably black or a dark subdued color, the eye may readily be focused upon the reflective field and the image therein, clear and distinct from any otherwise distracting light rays which are reflected from the brilliantly finished marginal portion 3 of the frame. The field is vividly accentuated and brought out in bold contrast with the margin and even in a manner which so separates the margin from the field as to render the former practically unnoticeable while viewing the field.

What is claimed is:

1. A rear view mirror for motor vehicles comprising a reflective plate, a frame encircling the same and having a brilliant finish simulating the field, and a non-reflecting border separating the field from the frame whereby reflections from the field are definitely spaced from any reflected rays from the frame.

2. A rear view mirror for motor vehicles comprising a silvered reflecting field, a silvery finished frame encircling the field, and a colored border about the field spacing the latter inwardly from the frame.

3. A rear view mirror for motor vehicles comprising a reflecting field, a frame encircling the field and having a like appearance thereto, and a detachable non-reflective border about the field spacing the same from the frame.

4. A rear view mirror for motor vehicles comprising a reflecting field, a brightly and reflectively finished frame encircling the field, and a subdued border about the field detachably mounted within the frame and serving additionally to secure the reflective field against displacement from the frame.

ERWIN C. HORTON.